Nov. 10, 1959   W. J. OPOCENSKY   2,911,855
BEARING SPACER
Filed Sept. 30, 1957
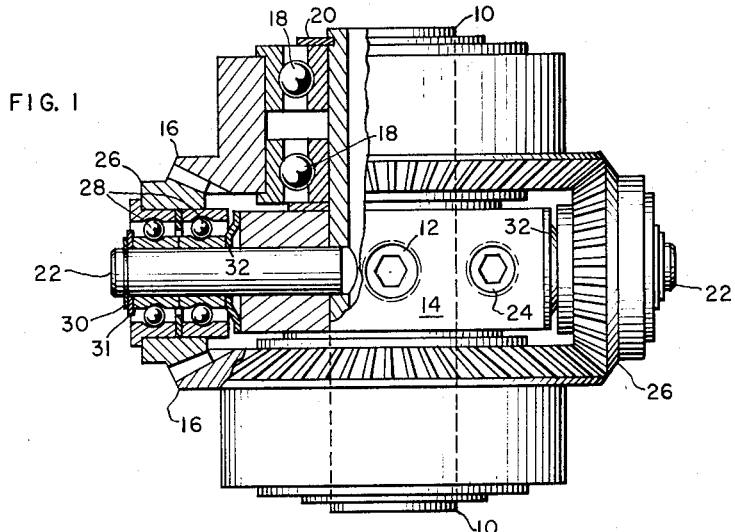
FIG. 1
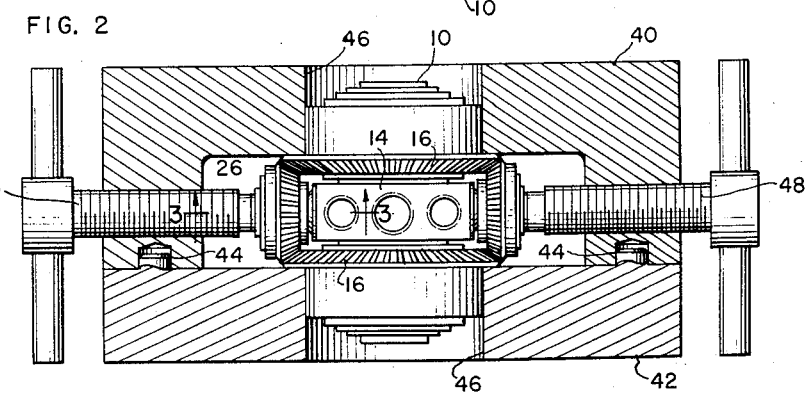
FIG. 2
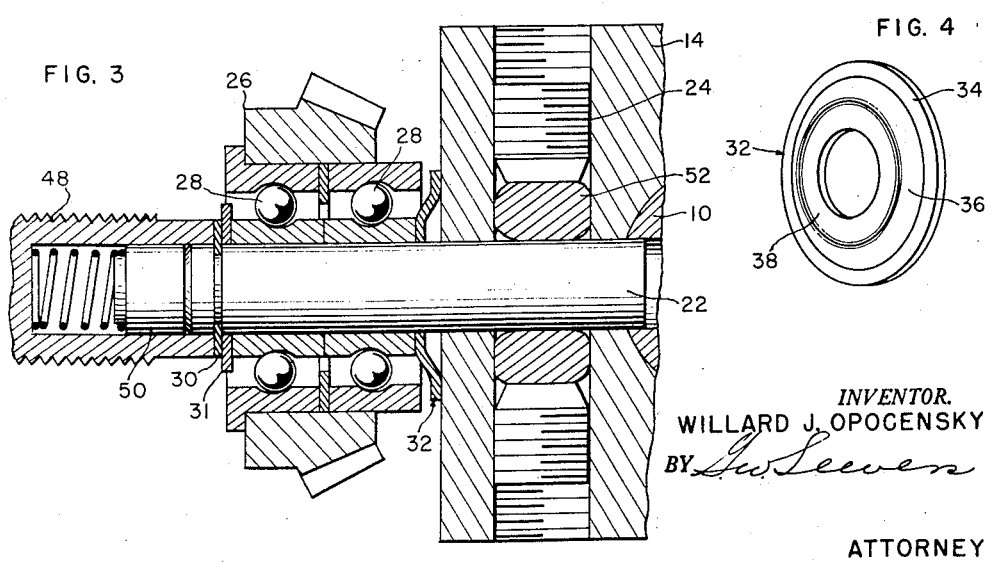
FIG. 3
FIG. 4
*INVENTOR.*
WILLARD J. OPOCENSKY
BY
ATTORNEY United States Patent Office 2,911,855
Patented Nov. 10, 1959

2,911,855

BEARING SPACER

Willard J. Opocensky, Glendale, Calif., assignor to Librascope, Incorporated, Glendale, Calif., a corporation of California Application September 30, 1957, Serial No. 686,981

2 Claims. (Cl. 74—713)

This invention relates to a spacer and a method for permanently positioning bearings or the like, and more particularly to a non-resilient spacer formed with offset surfaces which are adapted to be compressible from an exterior position after assembly and to a method of setting bearings with such a spacer.

Heretofore when bearings or the like were to be precisely positioned during assembly it was the practice to use shims or a combination of shims in back of such bearings and completing the assembly before determining the exact position of such bearing. Then by trial and error method of adding or reducing the total amount of shims, the final position of the bearing was established. This practice is time-consuming and costly, particularly in the assembly of bevel gear differentials wherein close tolerances of backlash are mandatory. This invention eliminates such time-consuming and costly practice of trial and error methods by replacing the shims with a formed non-resilient spacer that is adapted to be compressed from an exterior position after final assembly and which will retain such compressed condition permanently.

One object of this invention is to provide a spacer, for permanently locating two members in spaced relation, adapted to be compressed from an exterior position after assembly. Another object of this invention is to provide a non-resilient compressible spacer for locating and maintaining a pair of bevel gears in a permanent proper spaced relation.

Still another object of this invention is to provide a method of compressing a non-resilient spacer in a gear assembly after final assembly.

A further object of this invention is to provide a spacer, in a bevel gear assembly, that may be reduced in effective thickness to take up backlash caused by wear, while such gears are in an assembled condition.

Additional objects and advantages will become apparent in the following description in reference to the accompanying drawing, in which:

Figure 1 is an elevational view of a bevel gear differential embodying one form of this invention, parts being broken away in section to more clearly show the construction.

Figure 2 is a longitudinal section shown in the differential illustrated in Figure 1, positioned in a jig for compressing a spacer from an exterior position.

Figure 3 is a section taken on the line 3—3 of Figure 2.

Figure 4 is a perspective view of a compressible spacer embodying this invention.

Figure 1 illustrates a conventional form of a bevel gear differential constructed according to the method and using the spacer embodying this invention. The differential, as illustrated, comprises a shaft 10, secured by a set screw 12, in a spider block 14. Bevel gears 16 are fitted on the outer races of bearings 18, the inner races of which are retained on shaft 10 between spider block 14 and retaining ring 20.

Spider block 14 supports a pair of stub shafts 22 which are retained in position by set screws 24. A pair of bevel pinions 26 are each fitted onto the outer race of a pair of bearings 28, the inner races of which are fitted on the stub shafts 22. The outer ends of stub shafts 22 are provided with retaining rings 30 which engage flat washers 31, which in turn bear against the inner races of bearings 28.

A non-resilient compressible spacer 32 is positioned between, and engages, the spider block 14 and inner races of bearings 28. It is to be understood that the spacer 32 may be of several different shapes and material, but it is preferred for this particular embodiment to provide a spacer having a flat peripheral section 34, a frusto-conical midsection 36 and an inner flat ring section 38. The material for such spacer would preferably be made of a non-resilient rigid material such as annealed stainless steel that would be comparatively easily compressed and retain such compressed condition.

The assembled differential, as illustrated in Figure 1, is positioned in a jig, as illustrated in Figure 2. This jig is comprised of a body portion 40 and a cover portion 42. The two portions may be locked together by means of a dowel and socket 44. The body 40 and cover 42 are provided with axially aligned apertures 46 to snugly receive hubs of bevel gears 16. A pair of diametrically opposed screw jacks 48 are threaded through the body 40 of the jig, and are in axial alignment with stub shafts 22 of bevel pinions 26. Screw jacks 48 are provided with spring pressed plungers 50 (as best shown in Figure 3) to assure correct positioning of stub shafts 22.

The spacer 32, as originally inserted in the differential, provides excessive backlash between bevel pinions 26 and bevel gears 16. By screwing in the jacks 48 pressure is exerted against retaining rings 30, through flat washers 31, through inner races of bearings 28, and into the spacer 32. The exerted pressure permanently deforms spacer 32 and this reduces the effective thickness of the spacer 32, allowing bevel pinion 26 to move into closer engagement with bevel gears 16, which will reduce the backlash between the bevel gears and bevel pinions. By continuing screwing in the jacks 48 and simultaneously testing for backlash, the backlash may be reduced to a minimum, short of a binding engagement of the gear teeth. When this position is reached set screws 24 are screwed in against lead slugs 52 which compress against the stub shafts 22, locking them in place.

It will be seen from the foregoing that a permanently deformable spacer is provided which permits in situ adjustment of bearings and at the same time a method of setting or positioning of bearings and gears in apparatus such as differentials. It is to be understood that variations in size and shape of the spacer and in the setting method can be resorted to without departing from the spirit of my invention, as set forth in the appended claims:

I claim:

1. A differential comprising a pair of bevel gears, a bevel pinion meshing with said bevel gears, a ball bearing having an inner and outer race supporting said pinion, a spider supporting said bevel pinion and a permanently deformable non-resilient one piece spacer having a flat peripheral outer portion, a frusto-conical mid-portion and an inner flat annular center portion lying in a plane spaced from the plane of the flat peripheral portion, said spacer being positioned between said ball bearing and said spider with the inner flat annular center portion bearing against the inner race of said bearing and the outer portion bearing against said spider whereby said bearing is adjustably permanently spaced from said spider.

2. A differential comprising a pair of bevel gears, a bevel pinion meshing with said bevel gears, a ball bearing having an inner and outer race supporting said pinion, a spider supporting said bevel pinion, a permanently deformable non-resilient one piece spacer having a flat peripheral outer portion, a frusto-conical mid-portion and an inner flat annular center portion lying in a plane spaced from the plane of the flat peripheral portion, said spacer being positioned between said ball bearing and said spider with the inner flat annular center portion bearing against the inner race of said bearing and the outer portion bearing against said spider whereby said bearing is adjustably permanently spaced from said spider, and means to vary the effective thickness of said spacer.

References Cited in the file of this patent

UNITED STATES PATENTS

| | | |
|---|---|---|
| 1,311,473 | Vossler | July 29, 1919 |
| 1,350,325 | Miller | Aug. 24, 1920 |
| 2,586,087 | Reynolds et al. | Feb. 19, 1952 |
| 2,680,972 | Tone | June 15, 1954 |
| 2,774,253 | Minard et al. | Dec. 18, 1956 |